(12) United States Patent
Runeson et al.

(10) Patent No.: US 9,027,088 B2
(45) Date of Patent: May 5, 2015

(54) SYSTEMS AND METHODS FOR PROTECTION OF A SIP BACK-TO-BACK USER AGENT ON MODEMS

(71) Applicant: ST-Ericsson SA, Plan-les-Ouates (CH)

(72) Inventors: Stefan Runeson, Lund (SE); Per Stahl, Klagshamn (SE)

(73) Assignee: Ericsson Modems SA, le Grand-Saconnex (CH)

( * ) Notice: Subject to any disclaimer, the term of this patent is extended or adjusted under 35 U.S.C. 154(b) by 137 days.

(21) Appl. No.: 13/866,259

(22) Filed: Apr. 19, 2013

(65) Prior Publication Data

US 2013/0340047 A1    Dec. 19, 2013

Related U.S. Application Data

(60) Provisional application No. 61/659,540, filed on Jun. 14, 2012.

(51) Int. Cl.
*H04W 12/06* (2009.01)
*H04L 29/06* (2006.01)
*G06F 21/44* (2013.01)

(52) U.S. Cl.
CPC ........... *H04W 12/06* (2013.01); *H04L 65/1016* (2013.01); *G06F 21/44* (2013.01); *H04L 63/08* (2013.01); *H04L 65/1006* (2013.01); *H04L 65/1073* (2013.01)

(58) Field of Classification Search
USPC .......................................................... 726/4
See application file for complete search history.

(56) References Cited

U.S. PATENT DOCUMENTS

| 7,024,688 | B1 * | 4/2006 | Faccin et al. ........................ 726/4 |
| 7,591,013 | B2 * | 9/2009 | Bhargava et al. ................ 726/14 |
| 7,950,045 | B2 * | 5/2011 | Bogineni et al. .................. 726/3 |
| 8,266,684 | B2 * | 9/2012 | Kline et al. ........................ 726/9 |

(Continued)

FOREIGN PATENT DOCUMENTS

| EP | 1 909 456 A2 | 4/2009 |
| WO | 2011/124834 A1 | 10/2011 |
| WO | 2012/075323 A1 | 6/2012 |

OTHER PUBLICATIONS

Zhang et al., "On the Feasibility of Launching the Man-In-The-Middle Attacks on VoIP from Remote Attackers", 2009, pp. 1-9.*

(Continued)

*Primary Examiner* — Yonas Bayou
(74) *Attorney, Agent, or Firm* — Patent Portfolio Builders PLLC

(57) ABSTRACT

Systems and methods are provided for authenticating Internet Protocol (IP) Multimedia Subsystem (IMS) applications in a User Equipment (UE). A method includes: receiving a first Session Initiation Protocol (SIP) REGISTER message from an IMS application operating on the UE; transmitting a response message to the IMS application based on the received first SIP REGISTER message; receiving a second SIP REGISTER message from the IMS application operating on the UE; determining authentication for the IMS application based on the received second SIP REGISTER message from the IMS application operating on the UE; and based on the step of determining authentication for the IMS application, if the IMS application is authorized, then transmitting information associated with the first and second SIP REGISTER messages toward a SIP node or if the IMS application is unauthorized, then discarding data associated with the first and second SIP REGISTER messages.

22 Claims, 9 Drawing Sheets

(56) References Cited

U.S. PATENT DOCUMENTS

| | | | |
|---|---|---|---|
| 8,270,418 B2* | 9/2012 | Vikberg et al. | 370/401 |
| 8,443,417 B2* | 5/2013 | Kim et al. | 726/2 |
| 8,713,705 B2* | 4/2014 | Ronchi et al. | 726/29 |
| 2004/0117657 A1* | 6/2004 | Gabor et al. | 713/201 |
| 2007/0198834 A1 | 8/2007 | Ksontini et al. | |
| 2008/0271126 A1* | 10/2008 | Saraf et al. | 726/5 |
| 2008/0274716 A1 | 11/2008 | Fok et al. | |
| 2009/0144806 A1* | 6/2009 | Gal et al. | 726/3 |
| 2010/0050234 A1* | 2/2010 | Lindholm et al. | 726/3 |
| 2010/0293593 A1* | 11/2010 | Lindholm et al. | 726/1 |
| 2012/0011273 A1* | 1/2012 | Van Elburg et al. | 709/238 |
| 2012/0069772 A1 | 3/2012 | Byrne et al. | |

OTHER PUBLICATIONS

International Search Report issued in corresponding International application No. PCT/EP2013/061865, date of mailing Aug. 16, 2013.

Northwestern University, Franks, J. et al., "HTTP Authentication: Basic and Digest Access Authentication; rfc2617.txt.," Jun. 1, 1999, XP015008400, ISSN: 0000-0003.

Rosenberg, J. et al., "SIP: Session Initiation Protocol," RFC 3261, Jun. 2002.

* cited by examiner

44

REGISTER IMS APP 40 ⟶ B2BUA 24

REGISTER sips:ss2.biloxi.example.com SIP/2.0
Via: SIP/2.0/TLS client.biloxi.example.com:5061;branch=z9hG4bKnashds7
Max-Forwards: 70
From: Bob <sips:bob@biloxi.example.com>;tag=a73kszlfl
To: Bob <sips:bob@biloxi.example.com>
Call-ID: 1j9FpLxk3uxtm8tn@biloxi.example.com
CSeq: 1 REGISTER
Contact: <sips:bob@client.biloxi.example.com>
Content-Length: 0

401 Unauthorized Message → IMS App 40

```
SIP/2.0 401 Unauthorized
Via: SIP/2.0/TLS client.biloxi.example.com:5061;branch=z9hG4bKnashds7
 ;received=192.0.2.201
From: Bob <sips:bob@biloxi.example.com>;tag=a73kszlfl
To: Bob <sips:bob@biloxi.example.com>;tag=1410948204
Call-ID: 1j9FpLxk3uxtm8tn@biloxi.example.com
CSeq: 1 REGISTER
WWW-Authenticate: Digest realm="atlanta.example.com", qop="auth",
 nonce="ea9c8e88df84flcec4341ae6cbe5a359",
 opaque="", stale=FALSE, algorithm=MD5
Content-Length: 0
```
60 { (braces around WWW-Authenticate lines)

REGISTER
IMS App 40 ⟶ B2BUA 24

REGISTER sips:ss2.biloxi.example.com SIP/2.0
Via: SIP/2.0/TLS client.biloxi.example.com:5061;branch=z9hG4bKnashd92
Max-Forwards: 70
From: Bob <sips:bob@biloxi.example.com>;tag=ja743ks76zlflH
To: Bob <sips:bob@biloxi.example.com>
Call-ID: 1j9FpLxk3uxtm8tn@biloxi.example.com
CSeq: 2 REGISTER
Contact: <sips:bob@client.biloxi.example.com>
62 { Authorization: Digest username="bob", realm="atlanta.example.com"
    nonce="ea9c8e88df84flcec4341ae6cbe5a359",opaque="",
    uri="sips:ss2.biloxi.example.com",
    response="dfe56131d1958046689d83306477ecc"
Content-Length: 0

FIG. 5c

SYSTEMS AND METHODS FOR PROTECTION OF A SIP BACK-TO-BACK USER AGENT ON MODEMS

TECHNICAL FIELD

The embodiments of the subject matter disclosed herein generally relate to communication devices and, more particularly, to systems, methods and devices for protection of a Session Initiation Protocol (SIP) (Back-to-Back User Agent) B2BUA on modems in such communication devices.

BACKGROUND

During the past years, the interest in using mobile and landline/wireline computing devices in day-to-day communications has increased. Desktop computers, workstations, and other wireline computers currently allow users to communicate, for example, via e-mail, video conferencing, and instant messaging (IM). Mobile devices, for example, mobile telephones, handheld computers, personal digital assistants (PDAs), etc., also allow users to communicate via e-mail, video conferencing, IM, and the like. Mobile telephones have conventionally served as voice communication devices, but through technological advancements they have recently proved to be effective devices for communicating data, graphics, etc. Wireless and landline technologies continue to merge into a more unified communication system, as user demand for seamless communications across different platforms increases, which in turn creates more usage, and leads to more services and system improvements. Additionally, these communication systems can evolve into new generations or partial generations of communication systems.

Various systems and methods have been used to deliver and/or request information between devices, nodes and networks in support of customer demand. In the context of networking applications and components, such as user equipments (UEs), routers and gateways, networking systems are processing an increasing amount of data bandwidth year after year. With the rapidly growing popularity of the Internet and various accessible content on fixed and mobile networks, many networking systems often need to process more data, offer more bandwidth and to quickly introduce more features to the system while minimizing any negative impact on the currently existing capabilities of the systems themselves. Additionally, there is a desire to minimize the ability of malicious intrusion while continuing to improve the capabilities of these various systems and their components including UEs, e.g., mobile phones.

Some UEs can execute a number of Internet Protocol (IP) Multimedia Subsystem (IMS) applications and it is expected that this will be true for more UEs in the future. In many cases Internet Protocol (IP) Multimedia Subsystem IMS services and applications are deployed on a UE. IMS applications when initially executed on a UE, will typically attempt to get authorization to connect, through a radio access network (RAN) that the UE is connected to, to a node in an IMS network. If multiple IMS applications are attempting to obtain access/authorization at a same/similar time, this can generate a large amount of traffic. This can be further complicated, if the IMS application attempting to gain access/authorization is not a desirable IMS application from the point of view of the user, the operator network, or other service providers potentially involved.

For example, a malicious application operating on a UE may attempt authorization for various purposes, like utilizing IMS to send data at low or no cost, setting up hidden IMS calls to premium rate numbers and performing different denial-of-service attacks.

Accordingly, it would be desirable for communication devices to be protected from usage by malicious applications.

SUMMARY

Exemplary embodiments describe, among other things, that a Back to Back User Agent (B2BUA) on a modem subsystem of a User Equipment (UE) authenticates applications that try to make use of the B2BUA. The B2BUA on the modem subsystem shares a common secret with trusted applications and authenticates the applications by, for example, reusing the standard Session Initiation Protocol (SIP) Authentication that is normally used for authentication of users between a SIP UA and a SIP registrar. This means that, among other things, no new Application Programming Interface (API) between the Application Processing Engine (APE) and the modem has to be introduced.

According to an exemplary embodiment there is a method for authenticating IMS applications in a UE, the method includes: receiving a first Session Initiation Protocol (SIP) REGISTER message from an IMS application operating on the UE; transmitting a response message to the IMS application based on the received first SIP REGISTER message; receiving a second SIP REGISTER message from the IMS application operating on the UE; determining authentication for the IMS application based on the received second SIP REGISTER message from the IMS application operating on the UE; based on the step of determining authentication for the IMS application, if the IMS application is authorized, then transmitting information associated with the first and second SIP REGISTER messages toward a SIP node or if the IMS application is unauthorized, then discarding data associated with the first and second SIP REGISTER messages.

According to another exemplary embodiment, there is a User Equipment (UE) for authenticating Internet Protocol (IP) Multimedia Subsystem (IMS), the UE includes: a processor in conjunction with a memory and a transceiver configured to perform the functions of a Back to Back User Agent (B2BUA) function which is configured to perform the steps of: receiving a first Session Initiation Protocol (SIP) REGISTER message from an IMS application operating on the UE; transmitting a response message to the IMS application based on the received first SIP REGISTER message; receiving a second SIP REGISTER message from the IMS application operating on the UE; determining authentication for the IMS application based on the received second SIP REGISTER message from the IMS application operating on the UE; and based on the step of determining authentication for the IMS application, if the IMS application is authorized, then transmitting information associated with the first and second SIP REGISTER messages toward a SIP node or if the IMS application is unauthorized, then discarding data associated with the first and second SIP REGISTER messages.

Acronyms/Abbreviations

APE: Application Processing Engine
IP: Internet Protocol
SIP: Session Initiation Protocol
B2BUA: Back to Back User Agent
P-CSCF: Proxy Call Session Control Function
S-CSCF: Serving Call Session Control Function
IMS: IP Multimedia Subsystem
RCS: Rich Communication Suite API: Application Programming Interface
HTTP: Hypertext Transfer Protocol
RFC: Request for Comments
IM: Instant Messaging
PDA: Personal Digital Assistant
RAN: Radio Access Network
UE: User Equipment
CDMA: Code Division Multiple Access
LTE: Long Term Evolution
UMTS: Universal Mobile Telecommunications System
GSM: Global System for Mobile Communications
GW: Gateway
OEM: Original Equipment Manufacturer

BRIEF DESCRIPTION OF THE DRAWINGS

The accompanying drawings illustrate exemplary embodiments, wherein:

FIGS. 5(a)-(c) depict an example of the content of messages 44-46 according to an exemplary embodiment;

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to exemplary embodiments, and in order to address, among other things, the problems discussed in the Background, a Back-to-Back User Agent (B2BUA) can be installed on a modem subsystem of a user equipment (UE) which can authenticate applications, e.g., Internet Protocol (IP) Multimedia Subsystem (IMS) applications, that try to make use of the B2BUA when attempting to gain access/authorization to operate in a network. The B2BUA (which is also a Session Initiation Protocol (SIP) B2BUA as used herein) is considered to be a logical function which separates calls and/or communication sessions into two separate legs and mediates SIP signaling between the call or session ends. In other words, the SIP B2BUA can perform the functions of a user agent server and the functions of a user agent client. In this context, B2BUAs differ from proxy servers in that B2BUAs are capable of providing a wider range of features, e.g., the B2BUAs participate in requests and maintain dialog state information for all active IMS applications, and not just the traditional feature of a proxy server, e.g., to connect clients.

The B2BUA on the modem subsystem can share a common secret with trusted applications and authenticates the applications by, for example, reusing the standard SIP Authentication that is normally used for authentication of users between a SIP User Agent (UA) and a SIP registrar. This means that, among other things, no new Application Programming Interface (API) between an Application Processing Engine (APE) and the modem on a UE has to be introduced. According to some embodiments, the B2BUA authenticates all of the applications which attempt to use the B2BUA. According to other exemplary embodiments, the B2BUA may authenticate only a subset of all of the applications which attempt to use the B2BUA. Prior to describing these systems and methods, an environment in which these systems and methods can be used will first be described with respect to FIG. 1.

Figure 1:
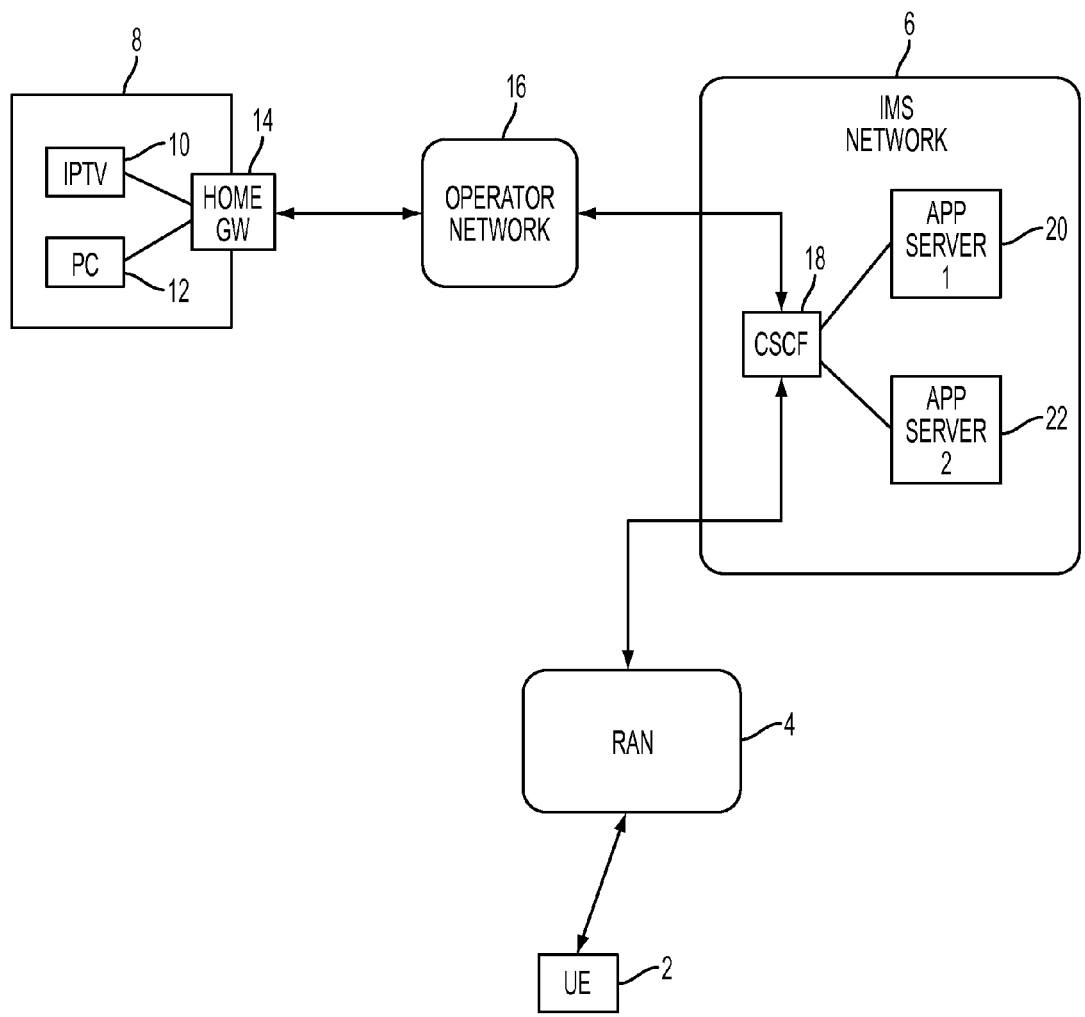
FIG. 1 shows an environment in which exemplary systems and methods can operate according to an exemplary embodiment.

According to an exemplary embodiment, FIG. 1 includes a UE 2 which is in communication with a radio access network (RAN) 4 which can facilitate communications between the UE 2 and an IMS network 6. The RAN 4 can be a Long Term Evolution (LTE) RAN or other type of legacy RAN such as a Universal Mobile Telecommunications System (UMTS) RAN, a Code Division Multiple Access (CDMA) RAN or a Global System for Mobile Communications (GSM) RAN. Additionally, a user's home 8 can include multiple devices, e.g., IPTV 10 and personal computer (PC) 12, which can use services provided by the IMS network 6. IPTV 10 and PC 12 can communicate with a home gateway (GW) 14 which in turn is in communications with an operator network (16) which can communicate with the IMS network 6, i.e., data can be sent back and forth for the IPTV 10 and PC 12 to the IMS network 6 via the home GW 14 and operator network 16. The IMS network can include a Call Session Control Function (CSCF) 18 and a plurality of application servers, e.g., APP Server1 20 and APP Server2 22.

Communications originating from the UE 2, the IPTV 10 and the PC 12 can go to the CSCF 18 in the IMS network 6 prior to being forwarded on to the application servers 20 and/or 22. While the application servers 20 and 22 are shown as being a part of the IMS network 6, they can be located in other networks. The CSCF 18 can represent one or more Proxy (P)-CSCFs and/or one or more Serving (S)-CSCFs. While, only certain networks, communication nodes, devices and associated communication links are shown, it is to be understood that this is a simplified representation and that more or fewer networks, nodes, devices and communication links can be used.

According to an embodiment, parts of the UE 2, e.g., a mobile phone, can include a modem subsystem and an Application Processing Engine (APE). In many cases IMS services can be deployed both on the modem subsystem and the APE. A telephony oriented IMS service (e.g. Voice over LTE or multimedia telephony IMS service) is naturally deployed on the modem subsystem as a counterpart to the circuit switched (CS) telephony service. A rich communication IMS service (e.g., Rich Communication Suite (RCS) Presence and file transfer) is naturally deployed on the APE, close to deployment of phone book and file system. An APE can consist of a central processing unit (CPU) system, which executes an operating system and applications. RCS Presence is an IMS service that can provide the status of contacts in, e.g., a phone book. The status may be, for example, busy, available or offline.

Figure 2:
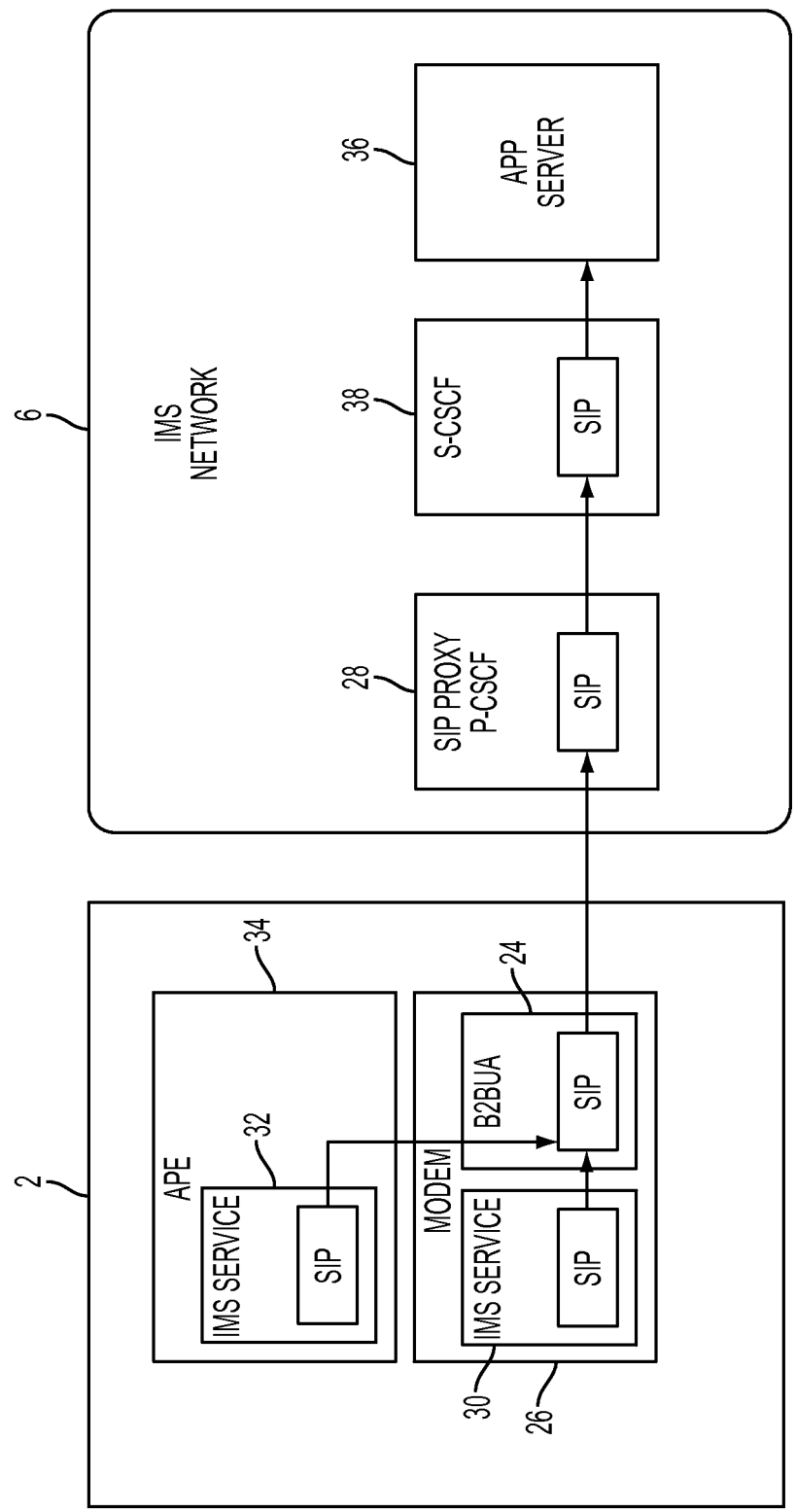
FIG. 2 depicts a (Back-to-Back User Agent) B2BUA subsystem and an Application Process Engine (APE) in a device, which are in communication with a proxy Call Session Control Function (P-CSCF) node according to an exemplary embodiment.

According to an exemplary embodiment, as shown in the system of FIG. 2, a SIP B2BUA 24 can be deployed on the modem subsystem 26 of the UE 2. The SIP B2BUA 24 captures all of the SIP messages having as their destination the outbound SIP proxy server P-CSCF 28. The SIP B2BUA 100 can merge SIP REGISTER messages from all running IMS services, e.g., IMS service 30, so that one single SIP REGISTER message carries information about all running IMS services, e.g., IMS applications, to the SIP registrar in the IMS network 6.

Furthermore, the SIP B2BUA 24 on the modem subsystem can 26 handle authentications and the Security Association (SA) to the outbound SIP proxy server P-CSCF 28 prior to service requests being passed onto an application server 36 via an S-CSCF 38. This can be done by the B2BUA 24 for all received requests or for a subset of the received requests. The SIP B2BUA 24 thus can autonomously generate and transmit SIP response messages which include response code 401 and/or 407. The 401 code message or the 407 code, per RFC 3261, can be issued by the B2BUA 24 in response to a received request for access/authorization by an IMS application on either the APE 34 or the IMS service 30 when there is either an incorrect Authorization header or no Authorization header as determined by the SIP B2BUA 24. This means that it can be desirable for there to be a trusted relationship between the SIP B2BUA 24 on the modem subsystem 26 and all IMS services 30 and 32, which can be IMS applications, both on the modem subsystem 30 and the APE 34.

Figure 3:
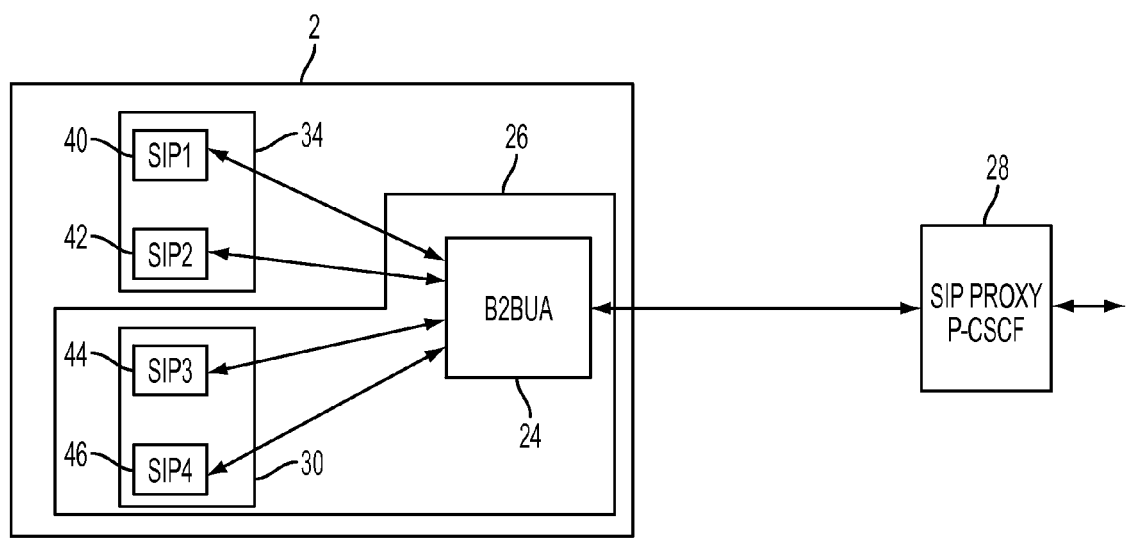
FIG. 3 illustrates a plurality of Internet Protocol (IP) Multimedia Subsystem (IMS) applications which are attempting to obtain access/authorization from the B2BUA according to an exemplary embodiment.

However, in systems and devices such as the UE 2 shown in FIG. 2, any application (which is capable of using SIP) can attempt to send SIP messages to the outbound SIP proxy server P-CSCF 28. According to an embodiment, the SIP messages are captured (all or a subset as desired) by the SIP B2BUA 24 on the modem subsystem 26. However, using conventional means, since the SIP B2BUA 24 has been authenticated by the P-CSCF 28 and has a Security Association (SA) with the P-CSCF 28, any application can make use of that authorization. For example, even a malicious application may use this authorization for various purposes, like utilizing IMS to send data at low or no cost, setting up hidden IMS calls to premium rate numbers and performing different denial-of-service attacks. An example of a UE 2 which is running multiple applications, of which some are malicious, is shown in FIG. 3. Exemplary systems and methods can be implemented onto the architecture shown in FIG. 2 for the environment shown in FIG. 1 to reduce and/or eliminate the effect of these malicious attacks as are described below in more detail.

According to an embodiment, FIG. 3 shows the UE 2 with its component functions of the APE 34 and modem 26 with its B2BUA 24. Also included are a plurality of functions, represented by SIP1 40, SIP2 42, SIP3 44 and SIP4 46, which have IMS applications which desire to access functions not located on the UE 2. For this example, let SIP3 44 be a malicious IMS application. As can be seen in FIG. 3, all of the requests are routed to the B2BUA 24 prior to any traffic being transmitted from the UE 2 to the SIP Proxy P-CSCF 28. In this case, routing to the B2BUA 24 is desirable in case any of the requests are malicious requests for denying the malicious requests access/authorization to services in a network, and to potentially reduce the quantity of message requests going from the UE 2 to the SIP Proxy P-CSCF 28.

Referring again to FIG. 2, according to an embodiment the SIP B2BUA 24 authenticates all applications (or alternatively a subset of all of the applications, e.g., the subset excluding one or more explicitly trusted applications) and authorizes only trusted applications, using standard SIP Authentication mechanisms, e.g., the Hypertext Transfer Protocol (HTTP) Basic Authorization or the HTTP Digest Access Authorization, specified in Request For Comments (RFC) 3261 and RFC 2617 which are incorporated herein by reference. For example, the SIP B2BUA 24 performs the steps/signals shown in FIG. 4.

According to an embodiment, when, for example, the SIP B2BUA 24 receives a SIP REGISTER message 44, the B2BUA 24 can discard all data from applications that have not yet sent any SIP REGISTER message(s). As shown by signal/step 46, the B2BUA 24 responds with a "401 Unauthorized" message 46 to the first SIP REGISTER message 44 received from any IMS application 40, 42. Stated differently, when the B2BUA 24 receives the SIP REGISTER message 44 from an application 40, 42, the B2BUA 24 requests that that particular application authenticate itself prior to allowing the requesting application to use the SIP B2BUA 24.

In response to the "401 Unauthorized" message 46, the IMS application 40, 42 which sent the first SIP REGISTER message 44 sends a further message, e.g., SIP REGISTER message 48 which provides the B2BUA 24 with authentication information associated with the requesting IMS application 40, 42, e.g., associated with the shared, trusted secret mentioned above. The B2BUA 24 evaluates the authentication information, e.g., the authorization header field in the SIP REGISTER message 48 from that application 40, 42, to determine if the IMS application 40, 42 is authorized or not. If the application is authorized, then the B2BUA 24 forwards all SIP messages from that application 106, 108 on to the P-CSCF 28, e.g., after further handshaking/authorization with that node as shown by signals/steps 50-58. Alternatively, if the application 40, 42 is not authorized, the B2BUA 24 discards all data received from that application 40, 42. Additionally, the B2BUA 24 may either respond with e.g. a "403 Forbidden" message or no message at all to the unauthorized application.

Figure 4:
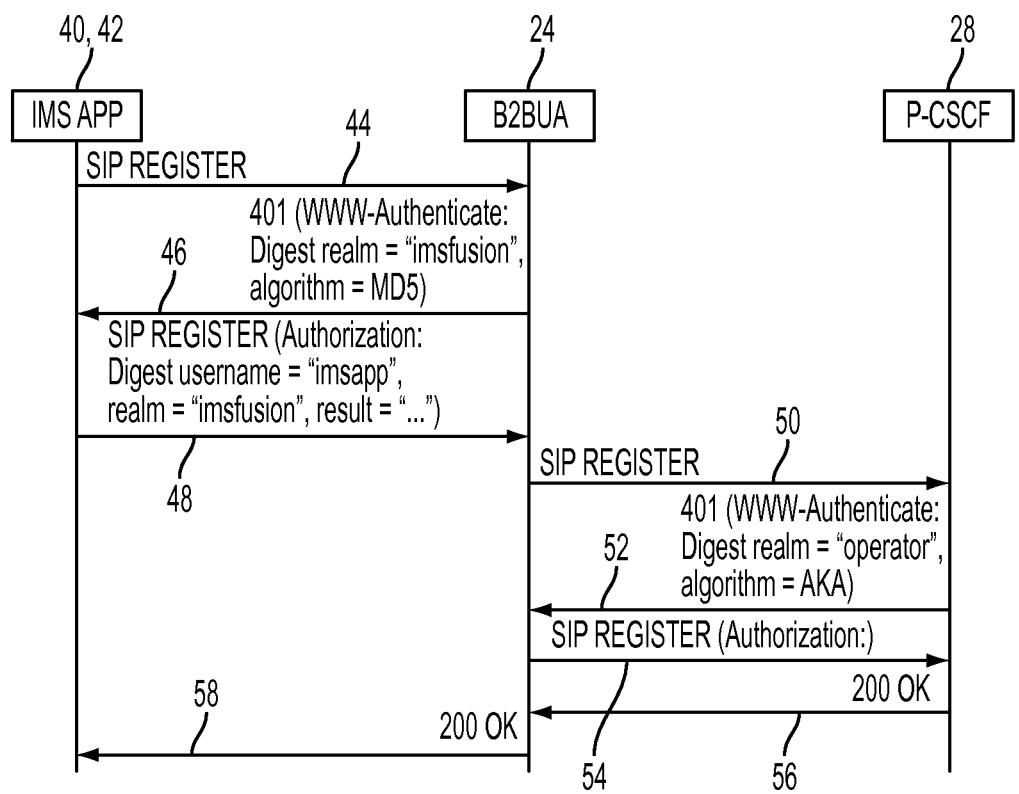
FIG. 4 is a signaling diagram illustrating signaling, and a method, for authenticating applications by a B2BUA in a modem subsystem according to exemplary embodiments.

In one embodiment, SIP B2BUA 24 authenticates all (or some) applications using HTTP Digest Access Authentication (as described, for example, in RFC 2617) using, e.g., username and password. One advantage with HTTP Digest Access Authentication is that passwords are not sent in the clear between applications 40, 42 and SIP B2BUA 24. Passwords can be stored either in the clear or encrypted in the SIP B2BUA 24. MD5 is a Message Digest algorithm is cryptographic hash function. An example of the messages 44-48 shown in FIG. 4, are shown in FIGS. 5(a)-5(c). FIG. 5(a) shows the SIP REGISTER message 44 from the IMS App 40, 42 and does not include desired authorization information. FIG. 5(b) illustrates the "401 Unauthorized" message 46 requesting authentication using the HTTP Digest Access Authentication procedure and FIG. 5(c) shows the SIP REGISTER message 48 from the IMS App 40, 42 and includes desired authorization information. Regarding FIGS. 5(a)-5(c), these Figures are purely illustrative in representing the content of the transmissions between the IMS App 40, 42 to the SIP B2BUA 24 other more specific details can be included which more accurately describe both the IMS App 40, 42 and the SIP B2BUA 24, e.g., the "From" and "To" content can be modified based on the correct description of both the IMS App 40, 42 and the SIP B2BUA 24.

In another embodiment, SIP B2BUA 100 authenticates all (or some) applications using HTTP Basic Access Authentication (RFC 2617). This can be performed in a similar fashion as shown in FIGS. 4 and 5(*a*)-5(*c*), by modifying the sections which use the HTTP Digest Access Authentication in an appropriate fashion for using the HTTP Basic Access Authentication. Additionally, as for the HTTP Digest Access Algorithm, the HTTP Basic Access Authentication can be used to authenticate all (or some) of the captured/received IMS applications.

According to an embodiment, security and authorization can also be performed through user names and passwords which can, for example, be defined by Original Equipment Manufacturer (OEM) operations for trusted IMS application developers and/or for trusted IMS applications. OEM can store user names and passwords on the modem subsystems, and can also revoke passwords by updating suitable memory locations in the modem subsystem. These user names and passwords can be stored in a persistent memory in the modem subsystem 26. Similarly, the usernames/passwords which are defined by OEM can thus be shared with IMS application developers, typically trusted IMS application developers, and provided (hidden) in the IMS application as part of the software development or provided during the IMS application installation. According to an embodiment, as shown in FIG. 4 above, the username and password(s) are used together for authorization. Additionally, OEMs may revoke passwords by Firmware-Over-the-Air update(s) of the persistent memory in the modem subsystem 26 (or the modem itself if present).

According to another embodiment, it may be desirable for B2BUA 24 to protect itself from usage from other devices with other IP addresses. The SIP B2BUA 24 can discard data from other Internet Protocol (IP) addresses than the IP address associated with the B2BUA 24. Additionally, the B2BUA 24 and all IMS applications 40, 42 in the device 2 have the same IP address. This can be performed alternatively or in addition to other embodiments described herein.

Among other advantages and benefits, these embodiments enable the SIP B2BUA on the modem subsystem to be protected from usage from malicious applications by authenticating all (or some) applications without the requirement of providing a new API between the APE 32 and the modem subsystem 26.

Figure 6:
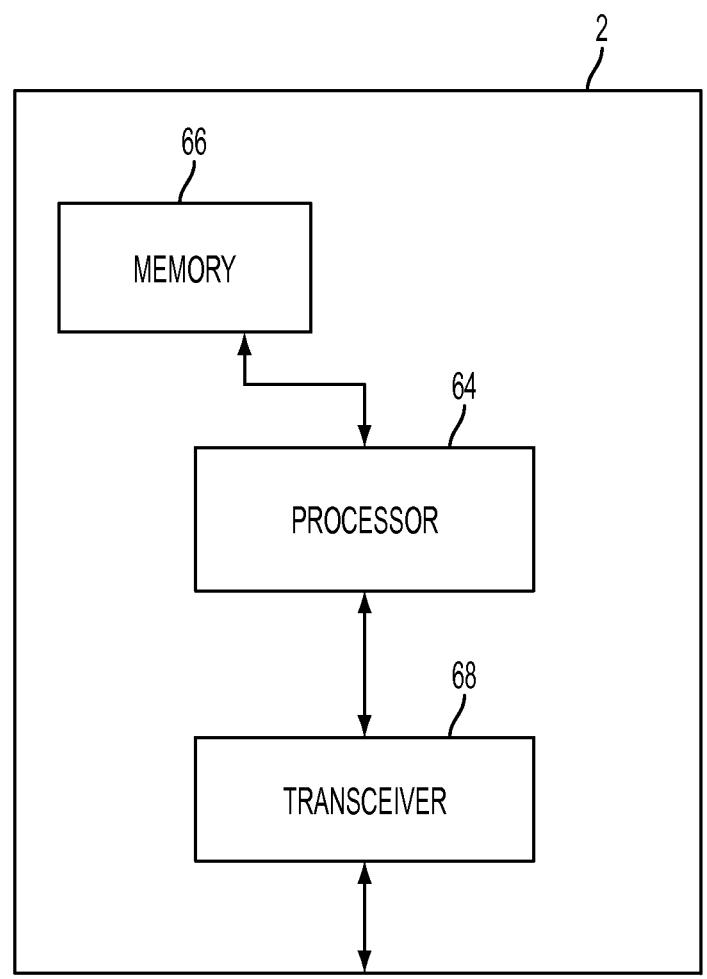
FIG. 6 shows an exemplary User Equipment (UE), e.g., a mobile phone, according to an exemplary embodiment.

The exemplary embodiments described above provide for authentication of applications (e.g., IMS applications) by a B2BUA 24 in a modem subsystem of a device, e.g., a mobile phone. An exemplary communications UE 2, e.g., mobile phone, which can provide such authentication is illustrated in FIG. 6. Therein one or more processor(s) 64 operate to perform operations, e.g., by executing software code, which can be stored in one or more memory units or devices 64. These operations and/or software code include those associated with, among other things, the APE 34, IMS services 30, 32 and modem subsystem 26 to include the B2BUA 24 described above with respect to FIG. 2. The UE 2 can also include a transceiver 68 which enables the device to communicate over a suitable air interface by transmitting and receiving radio signals. The modem subsystem 26 may be a physical or a logical entity within the UE 2. The modem subsystem 26 can be a part of the transceiver 68, use a portion of the transceiver 68 or be a separate portion of the UE 2 as desired. These signals can include, among other things, messages forwarded by the SIP B2BUA 24 toward a SIP node, e.g., SIP Proxy P-CSCF 28, for authorized IMS applications 40, 42, as described above.

Figure 7:
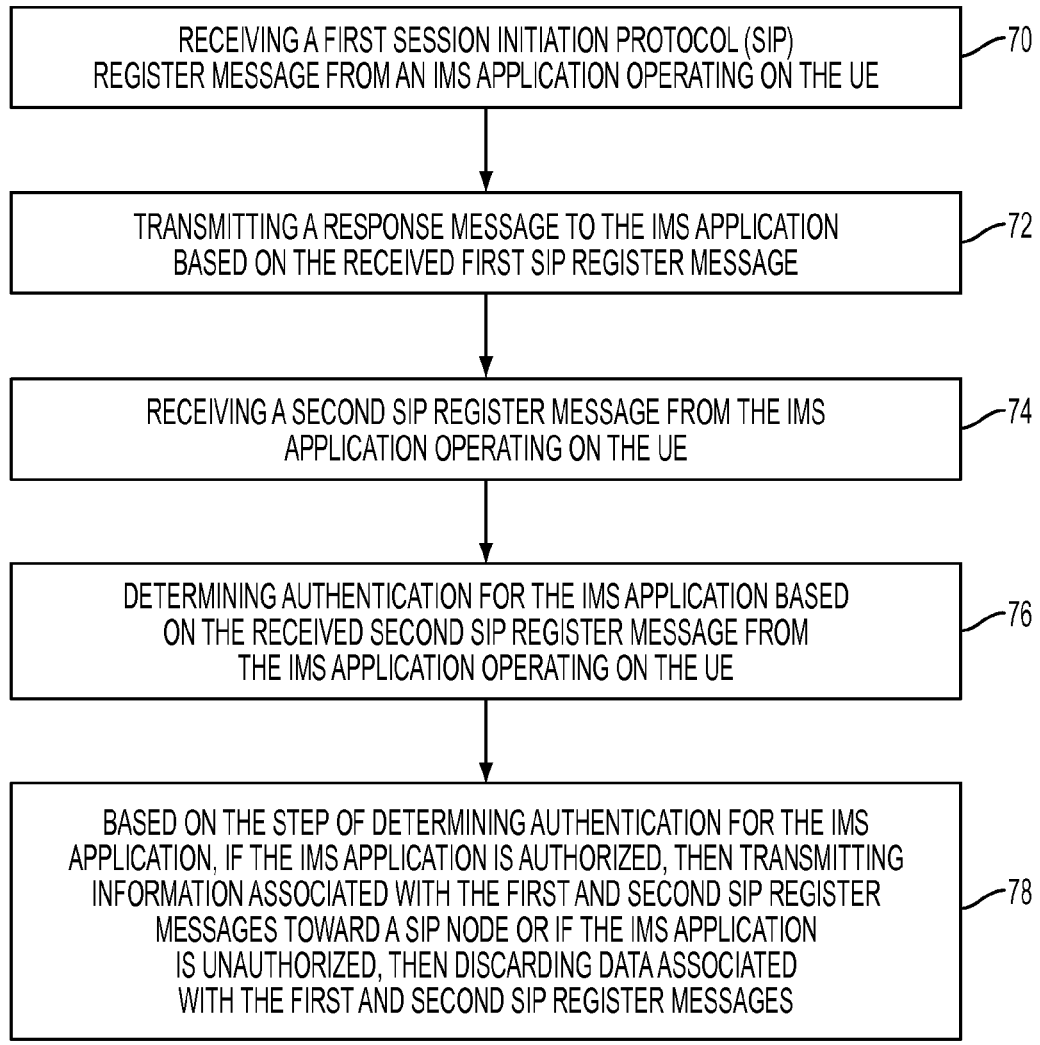
FIG. 7 shows a method flowchart according to an exemplary embodiment.

Utilizing the above-described exemplary systems according to exemplary embodiments, a method for authenticating IMS applications in a UE is shown in the flowchart of FIG. 7. The method includes: at step 70, receiving a first Session Initiation Protocol (SIP) REGISTER message from an IMS application operating on the UE; at step 72, transmitting a response message to the IMS application based on the received first SIP REGISTER message; at step 74, receiving a second SIP REGISTER message from the IMS application operating on the UE; at step 76, determining authentication for the IMS application based on the received second SIP REGISTER message from the IMS application operating on the UE; and at step 78, based on the step of determining authentication for the IMS application, if the IMS application is authorized, then transmitting information associated with the first and second SIP REGISTER messages toward a SIP node or if the IMS application is unauthorized, then discarding data associated with the first and second SIP REGISTER messages.

According to an exemplary embodiment there is a method for authenticating IMS applications in a device, the method comprising: receiving, at a B2BUA operating on a modem subsystem, a SIP REGISTER message from one of the applications, requesting, by the B2BUA, authentication information from the one of the applications, determining, by the B2BUA, whether the one of the applications is authorized to use the B2BUA, and if, the one of the applications is authorized, forwarding, by the B2BUA, messages and/or data received from the one of the applications.

According to another exemplary embodiment, there is a method for authenticating an IMS application operating in a device, the method comprising: receiving, by a B2BUA, a request from the IMS application, requesting, by the B2BUA, authentication information from the IMS application, evaluating, by the B2BUA, the authentication information to determine whether the IMS application is authorized to send messages and, if the IMS application is authorized, forwarding, by the B2BUA, messages received from the authorized IMS application toward a SIP node.

According to another exemplary embodiment there is a communication device for authenticating IMS applications operating in the communication device, the communication device including at least one processor configured to execute the IMS applications and a B2BUA, wherein the at least one processor is further configured to perform the functions described above with respect to either of the methods described in the previous two paragraphs.

The above-described exemplary embodiments are intended to be illustrative in all respects, rather than restrictive, of the present invention. Thus the present invention is capable of many variations in detailed implementation that can be derived from the description contained herein by a person skilled in the art. No element, act, or instruction used in the description of the present application should be construed as critical or essential to the invention unless explicitly described as such. Also, as used herein, the article "a" is intended to include one or more items.

What is claimed is:

1. A method for authenticating Internet Protocol (IP) Multimedia Subsystem (IMS) applications in a User Equipment (UE) the method comprising:

receiving in a Back-to-Back User Agent (B2BUA) operating on the User Equipment a first Session Initiation Protocol (SIP) REGISTER message from an IMS application operating on the UE;

transmitting a response message from the B2BUA to the IMS application based on the received first SIP REGISTER message;

receiving in the B2BUA a second SIP REGISTER message from the IMS application operating on the UE;

determining in the B2BUA authentication for the IMS application based on the received second SIP REGISTER message from the IMS application operating on the UE; and based on the step of determining authentication for the IMS application, if the IMS application is authorized, then transmitting information associated with the first and second SIP REGISTER messages toward a SIP node or if the IMS application is unauthorized, then discarding data associated with the first and second SIP REGISTER messages.

2. The method of claim 1, further comprising:
performing the functions of a user agent server; and
performing the functions of a user agent client, wherein performing the functions of a user agent server and client includes participating in requests and maintaining dialog state for all active IMS applications.

3. The method of claim 1, wherein the steps of receiving a first Session Initiation Protocol (SIP) REGISTER message from an IMS application operating on the UE;

transmitting a response message to the IMS application based on the received first SIP REGISTER message;

receiving a second SIP REGISTER message from the IMS application operating on the UE;

determining authentication for the IMS application based on the received second SIP REGISTER message from the IMS application operating on the UE; and based on the step of determining authentication for the IMS application, if the IMS application is authorized, then transmitting information associated with the first and second SIP REGISTER messages toward a SIP node or if the IMS application is unauthorized, then discarding data associated with the first and second SIP REGISTER messages, are performed for a plurality of IMS applications operating on the UE.

4. The method of claim 3, further comprising:
transmitting a message toward the SIP node which includes registration information for the plurality of IMS applications.

5. The method of claim 3, wherein all of the plurality of IMS applications undergo a determination for authentication.

6. The method of claim 3, wherein a subset of the plurality of IMS applications undergo a determination for authentication.

7. The method of claim 1, further comprising:
maintaining dialog state information for all active IMS applications.

8. The method of claim 1, wherein the UE is connected to a Long Term Evolution (LTE) Radio Access Network (RAN).

9. The method of claim 1, wherein the UE determines authorization for the IMS application using a Hypertext Transfer Protocol (HTTP) Basic Authorization.

10. The method of claim 1, wherein the UE determines authorization for the IMS application using a Hypertext Transfer Protocol (HTTP) Digest Access Authorization.

11. The method of claim 1, wherein the UE is a mobile phone.

12. A User Equipment (UE) for authenticating Internet Protocol (IP) Multimedia Subsystem (IMS), the UE comprising:

a processor in conjunction with a memory and a transceiver configured to perform the functions of a Back to Back User Agent (B2BUA) function, which B2BUA is configured to perform the steps of:

receiving a first Session Initiation Protocol (SIP) REGISTER message from an IMS application operating on the UE;

transmitting a response message to the IMS application based on the received first SIP REGISTER message;

receiving a second SIP REGISTER message from the IMS application operating on the UE;

determining authentication for the IMS application based on the received second SIP REGISTER message from the IMS application operating on the UE; and based on the step of determining authentication for the IMS application, if the IMS application is authorized, then transmitting information associated with the first and second SIP REGISTER messages toward a SIP node or if the IMS application is unauthorized, then discarding data associated with the first and second SIP REGISTER messages.

13. The UE of claim 12, wherein the B2BUA is further configured to perform the steps of:
performing the functions of a user agent server; an
performing the functions of a user agent client, wherein performing the functions of a user agent server and client includes participating in requests and maintaining dialog state for all active IMS applications.

14. The UE of claim 13, further comprising:
the B2BUA function configured to transmit a message toward the SIP node which includes registration information for the plurality of IMS applications.

15. The UE of claim 13, wherein all of the plurality of IMS applications undergo a determination for authentication.

16. The UE of claim 13, wherein a subset of the plurality of IMS applications undergo a determination for authentication.

17. The UE of claim 12, wherein the steps of receiving a first Session Initiation Protocol (SIP) REGISTER message from an IMS application operating on the UE;

transmitting a response message to the IMS application based on the received first SIP REGISTER message;

receiving a second SIP REGISTER message from the IMS application operating on the UE;

determining authentication for the IMS application based on the received second SIP REGISTER message from the IMS application operating on the UE; and based on the step of determining authentication for the IMS application, if the IMS application is authorized, then transmitting information associated with the first and second SIP REGISTER messages toward a SIP node or if the IMS application is unauthorized, then discarding data associated with the first and second SIP REGISTER messages, are performed for a plurality of IMS applications operating on the UE.

18. The method of claim 12, further comprising:
the B2BUA function configured to maintain dialog state information for all active IMS applications.

19. The UE of claim 12, wherein the UE is connected to a Long Term Evolution (LTE) Radio Access Network (RAN).

20. The UE of claim 12, wherein the UE determines authorization for the IMS application using a Hypertext Transfer Protocol (HTTP) Basic Authorization.

21. The UE of claim 12, wherein the UE determines authorization for the IMS application using a Hypertext Transfer Protocol (HTTP) Digest Access Authorization.

22. The UE of claim 12, wherein the UE is a mobile phone.

* * * * *